United States Patent [19]

Osuna-Diaz

[11] Patent Number: 5,067,893
[45] Date of Patent: Nov. 26, 1991

[54] INJECTION MOLDING APPARATUS WITH SHUT OFF VALVE PIN ACTUATION SYSTEM

[76] Inventor: Jesus M. Osuna-Diaz, 2365 Avon Industrial Dr., Rochester Hills, Mich. 48309

[21] Appl. No.: 538,523

[22] Filed: Jun. 15, 1990

[51] Int. Cl.⁵ .............................................. B29C 45/23
[52] U.S. Cl. .................................... 425/564; 251/250; 264/328.9; 425/566
[58] Field of Search ............... 251/250, 229; 425/549, 425/562, 564, 566, 570, 571, 572, 573; 264/328.8, 328.9, 328.15

[56] References Cited

U.S. PATENT DOCUMENTS

| | | | |
|---|---|---|---|
| 3,912,133 | 10/1975 | Hehl | 251/250 |
| 4,330,258 | 5/1982 | Gellert | 425/566 |
| 4,597,556 | 7/1986 | Sandling | 251/250 |
| 4,759,386 | 7/1988 | Grouw, III | 251/250 |

*Primary Examiner*—Timothy Heitbrink
*Attorney, Agent, or Firm*—John R. Benefiel

[57] ABSTRACT

Injection molding apparatus is disclosed having an actuation system for operation of a shut off valve pin, movably mounted in a valve gate, the system including a first gear rack connected to the valve pin, a first pinion gear driven by the first gear rack connected at one end of a cross shaft, a second pinion gear at the other end of the cross shaft, and a externally mounted two way power cylinder operating a second gear rack to rotate the second pinion gear in mesh therewith so that both pinion gears rotate together, and the valve pin is reciprocated by operation of the power cylinder. The power cylinder is mounted for angular adjustment about the axis of rotation of the pinion gears and cross shaft to enable ready adjustment of the closing position of the valve pin in the valve gate.

7 Claims, 4 Drawing Sheets

INJECTION MOLDING APPARATUS WITH SHUT OFF VALVE PIN ACTUATION SYSTEM

This invention concerns apparatus for injection molding, and more particularly actuation systems for operating a shut off valve pin at the mold cavity gate.

In some configurations of injection molding apparatus, particularly single cavity molds, the injection nozzle is aligned with the shut off valve pin, and a hot runner passage descends around the valve pin to the mold gate. The location of the hot runner passage close to the valve pin creates difficulty in designing on actuator, primarily because of the high temperatures close to the valve pin. Hydraulic piston-cylinder actuators create problems because heating of the hydraulic fluid to elevated temperatures is hazardous, while pneumatic cylinders are bulky when sized to produce adequate actuating forces.

There has heretofore been developed actuation systems in which the power cylinder is located to one side, and a pivoted actuator lever transfers motion of the piston to the valve pin.

This approach also has difficulties in that the high leverage developed by the lever causes the pivot pins to often be broken. Side loading of the valve pin by the lever also results in many of these designs. A recently introduced design interposes a rack and segment gear drive between lever and pin to reduce side loading The swing lever and cylinder are bulky and requires substantial space in which to operate.

Adjustment to enable the valve pin to be positioned properly in the closed position has been impossible to carry out with such mechanisms, and requires very precise machining and painstaking assembly of the components to achieve proper pin closing when the cylinder is fully stroked. If wear of the pin or other components causes proper closing to be lost, the mold must be disassembled and repaired.

SUMMARY OF THE INVENTION

The present invention comprises a hydraulic piston and cylinder actuator, in which a transversely extending shaft is rotated by a rack driving piston and engaging a pinion gear on one end of the shaft. The other end of the shaft also has a pinion gear which drives a rack connected to the upper end of the valve pin. The piston and cylinder actuator is mounted to the exterior of the mold housing so as to be able to be rotated about the shaft axis to conveniently obtain a precision angular adjustment of the shaft and hence the closed position of the valve pin.

The design is compact and the components are completely enclosed.

A one-to-one mechanical advantage and elimination of a pivoted lever greatly reduces the breakage, deformation, and wear out of the parts typically causing malfunction in prior art designs.

DETAILED DESCRIPTION

In the following detailed description, certain specific terminology will be employed for the sake of clarity and a particular embodiment described in accordnace with the requirements of 35 USC 112, but it is to be understood that the same is not intended to be limiting and should not be so construed inasmuch as the invention is capable of taking many forms and variations within the scope of the appended claims.

Figure 1:
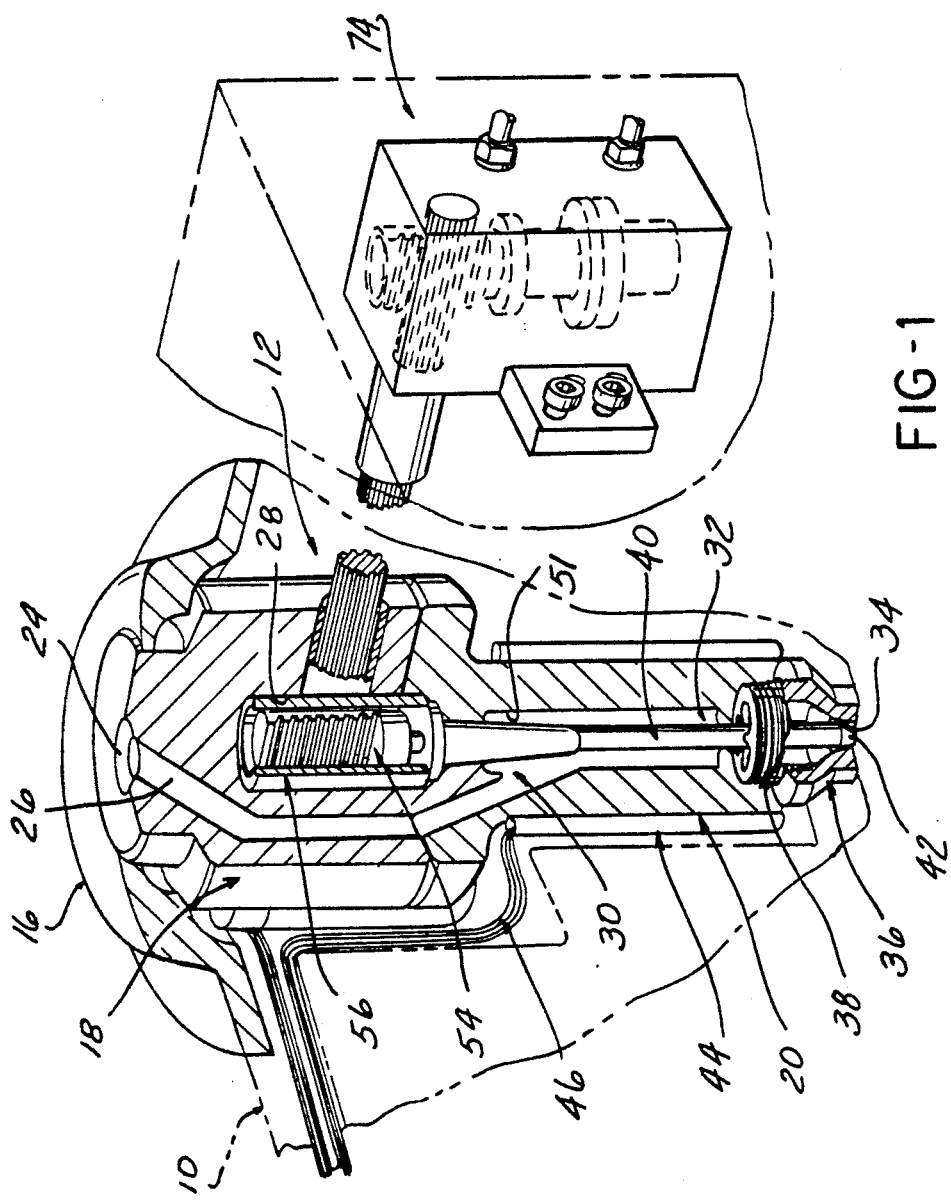
FIG. 1 is a perspective fragmentary view of an actuator system for an injection mold valve pin according to the present invention, with portions of the mold housing depicted in phantom.
Figure 2:
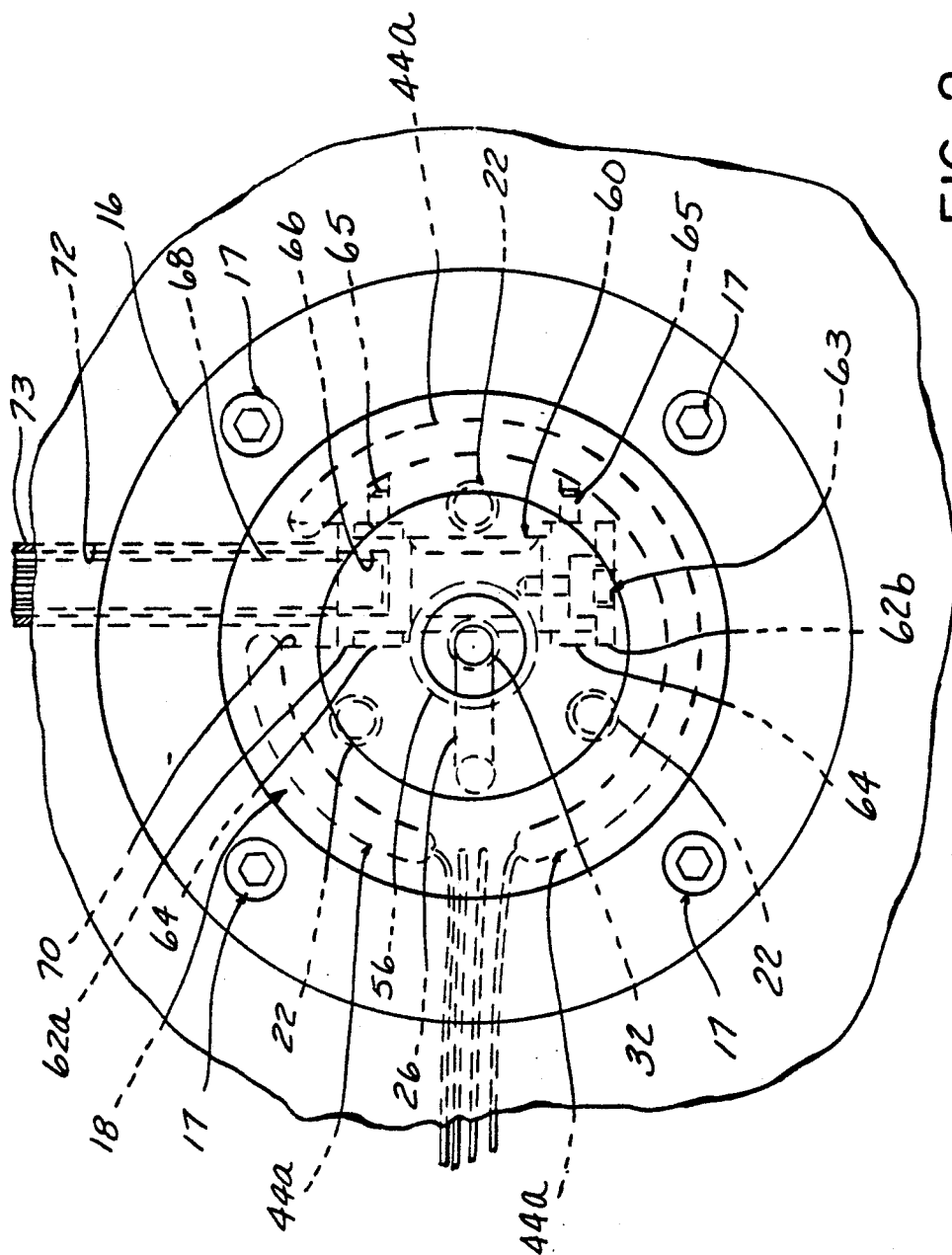
FIG. 2 is a plan view of an injection nozzle with the associated valve pin drive components of the actuator system according to the present invention.

Referring to FIG. 1, a portion of an injection molding apparatus is shown, including a cavity plate 10 having a recess 11 in which is mounted an injection nozzle 12, retained therein by a cap plate 16 and capscrews 17 (FIG. 2).

Figure 3:
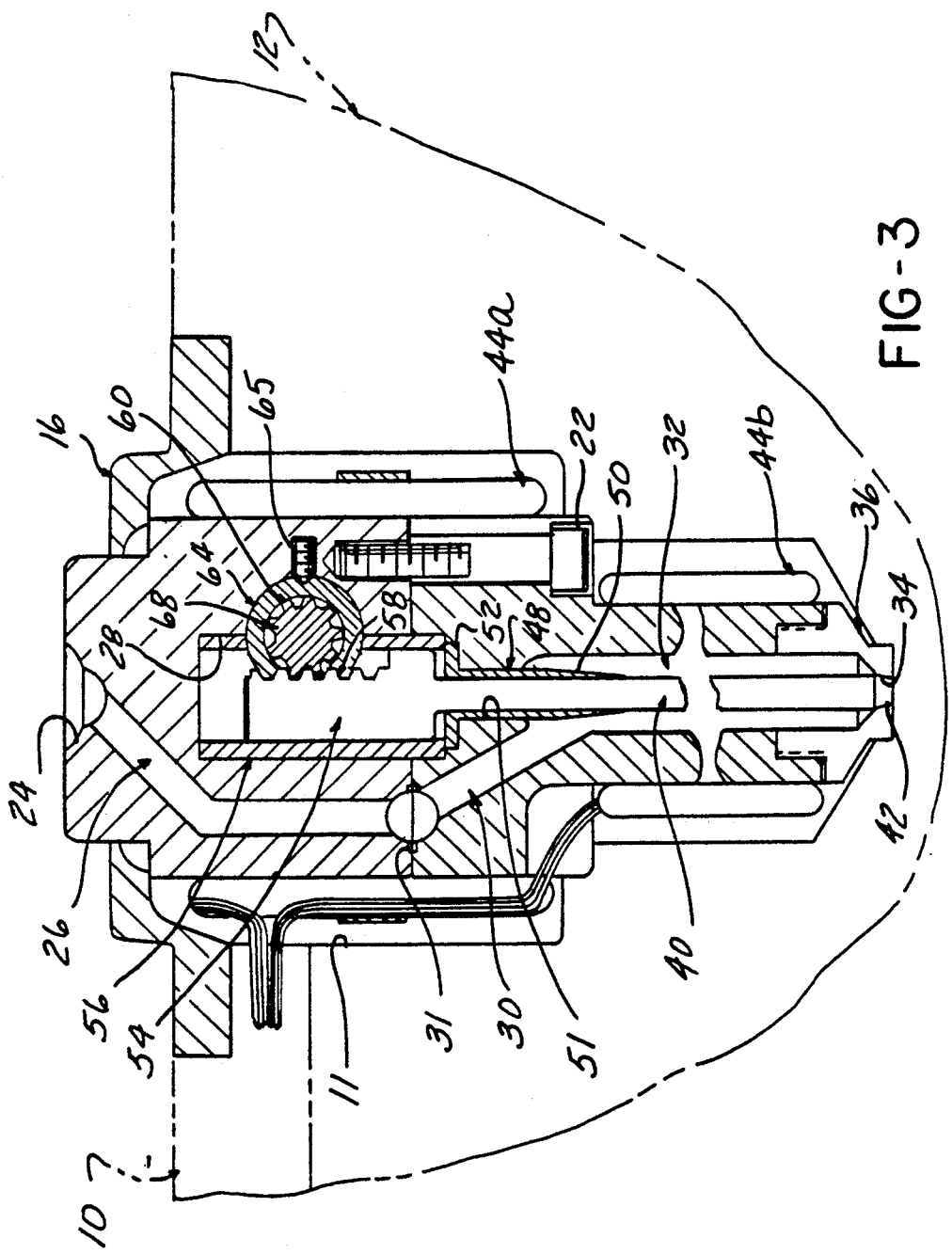
FIG. 3 is a front elevational sectioned view of the nozzle shown in FIGS. 1 and 2.
Figure 4:
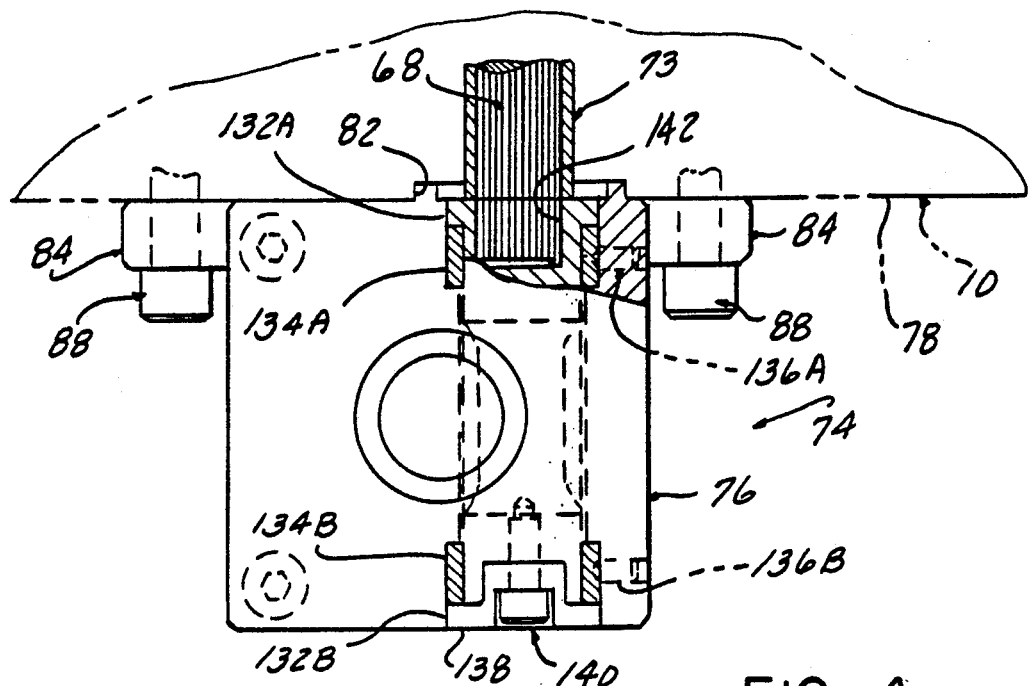
FIG. 4 is a plan view of the power cylinder assembly forming a part of the actuator system according to the present invention.
Figure 5:
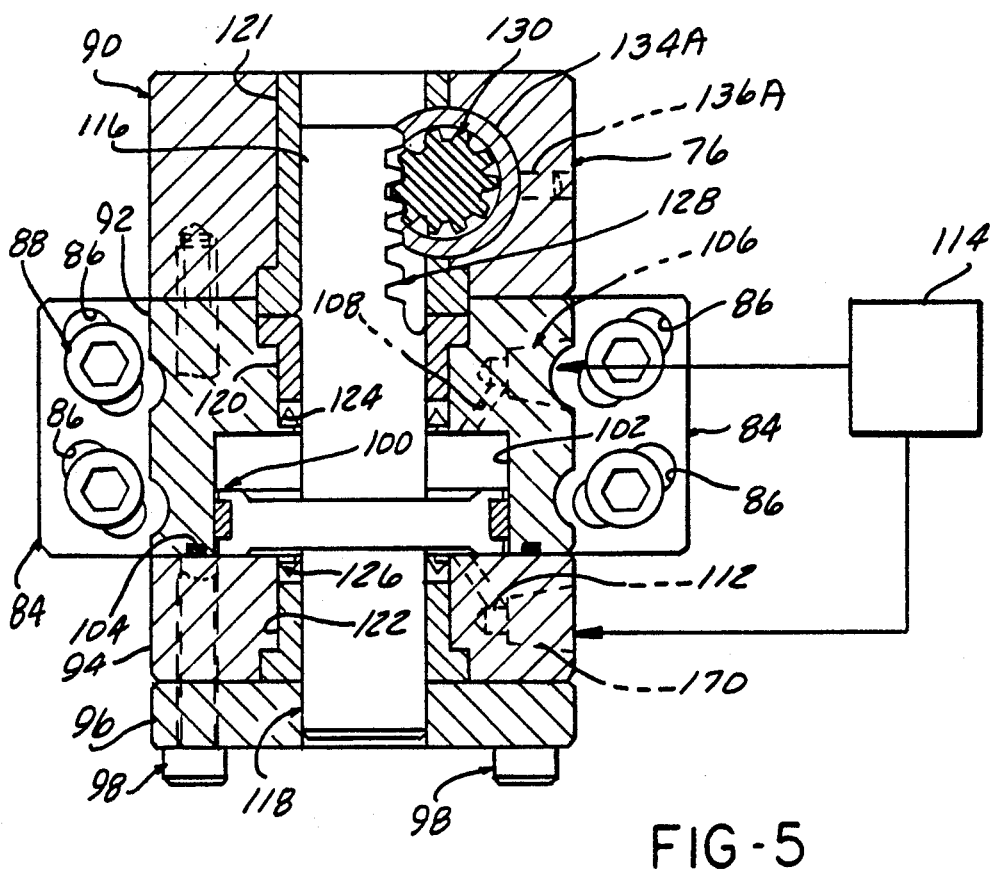
FIG. 5 is a side elevational view of the power cylinder assembly shown in FIGS. 1 and 4.

The injection nozzle 12 is comprised of an upper section 18 and lower section 20 fastened together with capscrews 22 (FIG. 3).

The upper section 18 is formed with an injection port 24 into which is injected hot melt from a nozzle of a molding machine (not shown). A hot runner passage 26 is angled radially out from the center location of the entry port 24, descending alongside a central cavity 28 and extending to a continuation runner passage 30 in the lower housing section 20', runner passage 30 angles radially in, entering a central bore forming a passage 32 terminating in a tapered gate 34 communicating with the mold cavity (not shown). The tapered gate 34 is formed in an injection tip 36 threaded into the end of the lower section 20. A seal 31 may be provided (FIG. 3) surrounding passages 26, 30 of the parting line between the sections 18, 20.

A centering guide piece 38 for a valve pin 40 may also be provided, as shown in FIG. 1 only, the guide piece 38 having openings 39 allowing flow of melt past the valve pin 40. The valve pin 40 terminates in a tapered tip 42 configured to fit into the gate 34 and shut off flow when moved downwardly by the actuator system according to the present invention.

Upper and lower heater windings 44a, 44b surround the upper and lower sections 18, 20, energized via electrical leads 46 to heat the hot melt in the passages 26, 30, 32 in the manner well known in the art.

A sealing guide bushing 48 may also be provided, comprised of a tapered sleeve 50 integral with an annular piece 52 seated at the lower end of central space 28. The tapered sleeve 50 is fit into an opening 51 so that the thin wall of the tapered sleeve 50 passes into connecting passage 32. Sleeve 50 sealingly grips the outside of the valve pin 40 when pressurized melt is present in the central bore forming passage 32.

The valve pin 40 is formed with an integral upper headed portion 54 of enlarged diameter, slidable within a bushing sleeve 56 fit within passage 32.

Headed portion 54 of valve pin 40 is formed with a series of gear teeth forming a rack 58 on one side thereof which is engaged with pinion gear 60 (FIGS. 2, 3). Pinion gear 60 is formed with end caps 62a, 62b of a larger diameter than the gear portion, the end caps 62a, 62b each received in a bearing 64 and held with set screws 65.

End cap 62a has a splined socket 66 into which is received one end of a mating splined cross shaft 68 housing in a tube 73 entering through an opening 70 in the upper section 18 and an opening 72 in the cavity plate 10. End cap 62b is secured with a capscrew 63 (FIG. 2).

The cross shaft 68 extends out of the cavity plate 10 and into an actuator cylinder assembly 74 including a housing 76 mounted to the exterior of the cavity plate 10.

The cylinder housing 76 is attached to a side wall surface 78 of the cavity plate 10 so as to be angularly adjustable. A boss or lip 80 concentric with the axis of the cross shaft 68 projects into a pilot bore 82 recessed into surface 78, and is piloted therein. A pair of internal lateral lugs 84 project to either side of the housing 76, formed with two sets of arcuate openings 86 having a radius aligned with the axis of the cross shaft 68. Capscrews 88 pass through each opening 86 and are threaded into the cavity plate 10, enabling securement of the housing 76 in angularly adjusted positions.

The housing 76 is composed of an upper section 90, an intermediate section 92, a lower section 94, and a bottom cover 96 held together with cap screws 98. A piston 100 is slidably mounted in a cylinder bore 102 formed in intermediate housing section 92. The bore 102 is closed off by lower housing section 94, O-ring seals 104 creating a fluid type chamber. The region of the bore 102 on the upper side of the piston 100 communicates with a first port 106 via a passage 102, while the region of the bore 102 beneath the piston 100 communicates with a second port 110 via passage 112. The ports 106, 110 are adapted to be selectively pressurized and vented to allow a double action to drive the piston in either direction by a hydraulic power system 114, including suitable valving and a hydraulic pressure source.

The piston 100 is formed with oppositely extending upper and lower piston rods 116, 118 guided in respective bearings 120, 121, 122, with seals 124, 126 preventing leakage of hydraulic fluid.

The upper piston rod 116 is of somewhat longer length than the lower piston rod 118, and is formed on one side with teeth forming a gear rack 128.

A pinion gear 130 is in mesh with the gear rack 128, pinion gear 130 formed with end cap portions 132a, 132b supported in bearings 134a, 134b secured against rotation by set screws 136a, 136b. A retainer cap 138 is secured against bearing 134b and end cap portion 132b with a capscrew 140.

End cap portion 132a is formed with a splined bore 142 mating with the opposite end of splined cross shaft 68 to be rotatably connected to the cross shaft 68.

Thus, as the piston 100 is driven up, pinion gear 130 is rotated clockwise and, via the connection with the cross shaft 68, the pinion gear 60 is also rotated clockwise to in turn drive the valve pin 40 upwardly to open gate 34.

When piston 100 is driven down, counterclockwise rotation of the pinion gears 60, 130 results, causing the valve pin to be driven down to close the gate 34.

By loosening the screws 88 and rotating the housing 76 in either direction, an adjustment of the angular position of the shaft and thus the full down position of the valve pin 40 can be achieved and maintained by retightening screws 88.

A one-to-one ratio of the gearing is preferred to avoid excessive forces from being imposed on the valve pin 40 and other components, and also defeats advance of the piston when an improper melt condition exists, providing an indication of a problem to the operator.

It thus would be appreciated that a compact, fully enclosed and troublefree actuation system is provided by this arrangement, which allows ready adjustment of the closed position of the valve pin.

What is claimed is:

1. An injecting molding apparatus including an injection nozzle having a gate through which melt is injected into a mold cavity, an actuation system for a shut off valve pin, said valve pin having a tapered tip disposed within the gate of said injection nozzle, said actuation system comprising:
   a first gear rack connected to said valve pin to extend upwardly therefrom;
   a rotatably mounted first pinion gear meshing with said first gear rack;
   a power cylinder including a cylinder housing, and a piston movably disposed in a bore formed in said cylinder housing;
   a second gear rack connected to said piston to be reciprocated by movement of said piston in said bore;
   a rotatably mounted second pinion gear in mesh with said second gear rack connected to said piston;
   a cross shaft mounted or rotation about an axis extending through the length of said cross shaft, said cross shaft drivingly connecting said first and second pinion gears to rotate together about said axis of said cross shaft;
   means for supplying fluid pressure to said bore to cause said piston to move so as to drive said connected first gear rack, said first and second pinion gears, and said second gear rack connected to said valve pin to move said valve pin to a closed position in said gate; and,
   means for selectively allowing adjustment of the angular position of said cylinder housing about an axis aligned with the axis of rotation of said cross shaft to thereby enable adjustment of said closed position of said valve pin in said gate.

2. The injection molding apparatus according to claim 1 wherein said piston has an integral piston rod and said second gear rack is formed in a section of said piston rod.

3. The injection molding apparatus according to claim 1 wherein said first and second pinion gears each include an axial splined bore aligned with each other and said cross shaft is splined at each end and inserted in each bore to thereby drivingly connect said pinion gears.

4. The injection molding apparatus according to claim 1 wherein the ratio of said first gear to said second gear and said first pinion gear to said second pinion gear is 1 to 1.

5. The injection molding apparatus according to claim 1 wherein said valve pin has an integral headed portion at an end opposite said tapered tip, gear teeth formed therein comprising said first gear rack.

6. The injection molding apparatus according to claim 1 wherein said housing includes a projecting lip piloted in a bore surrounding said cross shaft to mount said housing for rotation about the axis of said cross shaft.

7. The injection molding apparatus according to claim 6 wherein said housing has arcuate slots having a radius centered on said axis of rotation of said cross shaft, with screws inserted therein to secure said housing in any adjusted angular position.

* * * * *